J. W. ROGERS.
PEDAL LOCK.
APPLICATION FILED JAN. 3, 1921.
1,411,521. Patented Apr. 4, 1922.
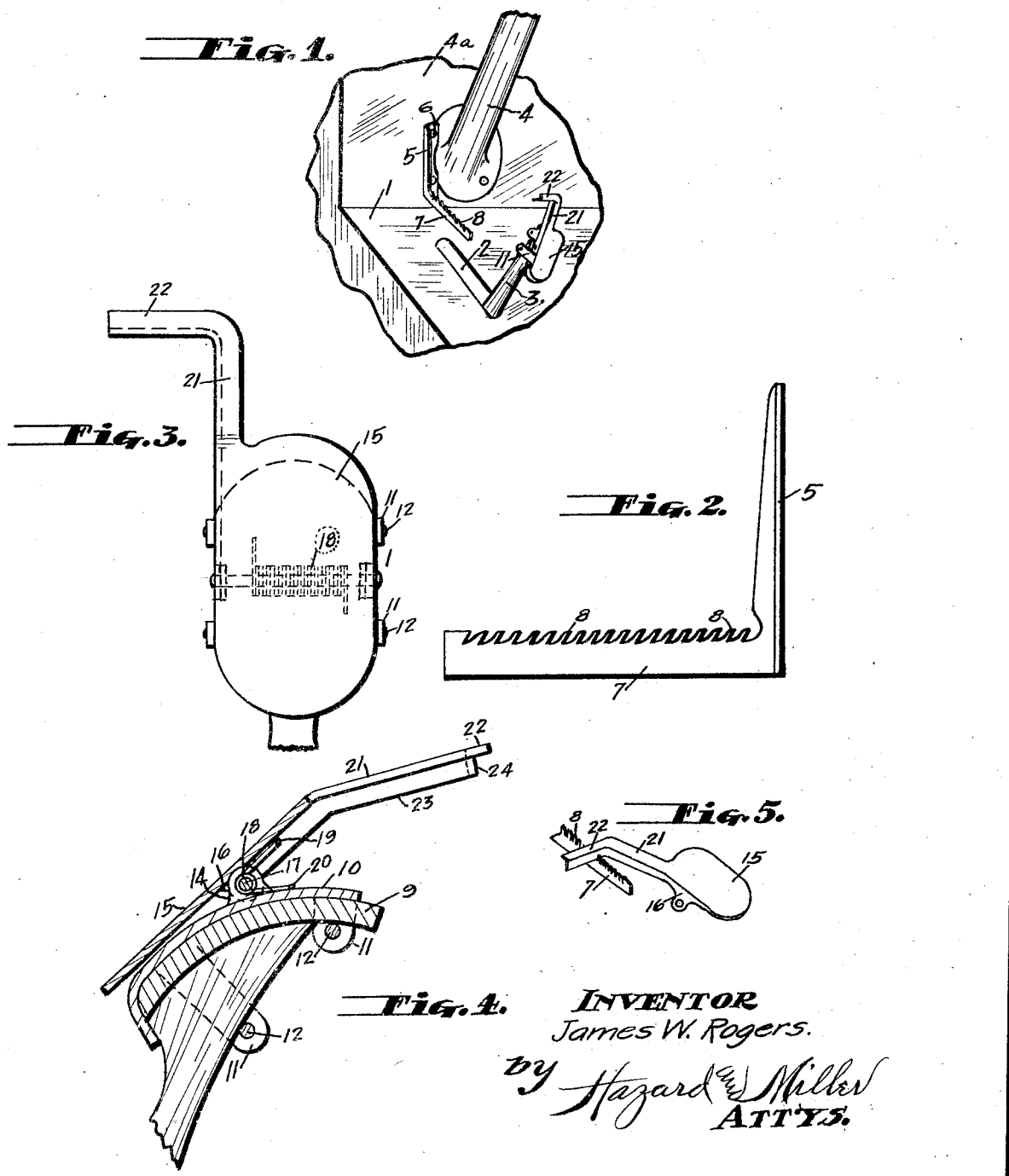

UNITED STATES PATENT OFFICE.

JAMES W. ROGERS, OF LONG BEACH, CALIFORNIA.

PEDAL LOCK.

1,411,521. Specification of Letters Patent. Patented Apr. 4, 1922.

Application filed January 3, 1921. Serial No. 434,685.

*To all whom it may concern:*

Be it known that I, JAMES W. ROGERS, a citizen of the United States, residing at Long Beach, in the county of Los Angeles and State of California, have invented new and useful Improvements in Pedal Locks, of which the following is a specification.

It is the object of this invention to provide means whereby a foot pedal may be readily locked in depressed position and as readily released. The invention is particularly adapted to be employed in connection with the type of automobile having a foot pedal arranged to be depressed to move the transmission into low gear, and adapted to be released and automatically swung upwardly for placing the transmission in high gear.

More particularly the invention contemplates the provision of an attachment for the usual foot pedal of this type, which when the pedal is depressed, may be moved by the foot into locking engagement with a suitable rack, and which when it is desired to release the pedal, may be moved by the foot so as to disengage the same from the rack.

The invention will be readily understood from the following description of the accompanying drawings, in which:

Figure 1 is a perspective view showing a foot pedal of the type described having the locking attachment applied thereto, and showing the locking rack adapted to be engaged by the attachment when the pedal is depressed.

Fig. 2 is a side elevation of the locking rack.

Fig. 3 is a front elevation of the locking attachment.

Fig. 4 is a longitudinal section on the line 4—4 of Fig. 3.

Fig. 5 is a fragmentary perspective view showing the pedal depressed and the locking attachment moved into engagement with the locking bar.

In the drawings, I have illustrated the usual floor boards of an automobile at 1, having the slot 2 therein through which the pedal 3 moves. The pedal is normally swung upwardly as shown in Figure 1, and in this position the transmission is in high gear; and when it is desired to move the transmission into low gear, the pedal is depressed and thereby swung to the forward end of its slot. A usual steering post is shown at 4 projecting from the upright 4ª at the front of floor boards 1, and the locking rack adapted to be engaged by the attachment carried by the pedal is mounted at the side of the steering post upon the upright 4ª.

The locking rack comprises a bracket 5 secured by bolts 6 to upright 4ª, and a rearwardly extending arm 7 projecting from the lower end of the bracket and having the rack teeth 8 along its upper edge.

The locking attachment adapted to engage this rack is mounted upon the usual pedal head 9, and includes a bracket 10 having the depending side ears 11 adapted to be connected by bolts 12 extending beneath the pedal head for securely fastening bracket 10 to the pedal head. It will be understood that the bracket 10 conforms to the curvature of the pedal head, so as to fit snugly upon the same. The bracket 10 is provided with upwardly extending side lugs 14, and a plate 15 is pivoted over these lugs as by being provided with depending lugs 16 alining with lugs 14, and having a pivot bolt 17 received through said alined lugs. A coil spring 18 is received upon pivot bolt 17 with one end thereof abutting against plate 15 as shown at 19, and its opposite end abutting against bracket 10 as shown at 20, so as to normally swing the forward end of plate 15 upwardly until its rear end abuts against plate 10.

The forward end of plate 15 is provided at one side with a longitudinally projecting arm 21 so arranged that when the pedal is depressed, said arm will lie along side of and parallel to rack bar 7. This arm is provided with a transversely extending end 22, and arm 21 and its end extension 22 are provided with a side flange 23, which upon the transverse extension forms a bar 24 adapted to engage teeth 8 when the pedal is depressed and the forward end of plate 15 is swung upwardly against the action of spring 18.

In operation when pedal 3 is depressed, and it is desired to lock the same in its depressed position so as to retain the transmission in low gear, pressure is applied through the foot to the forward end of plate 15, so that the transverse extension 22 engages teeth 8, and thereby locks the pedal. When it is desired to again release the pedal so that the transmission will move into high gear, the locking extension 22 is disengaged from teeth 8 by pressure upon plate 15, and the pedal will then automatically return from its depressed position in usual manner.

It will be understood that the spring 18 will tend to disengage the locking extension 22 from teeth 8, but when the extension has been moved into engagement with the teeth, the latter will bind against the extension so as to retain the extension in engagement with teeth 8 until subsequently released; and an efficient lock is thus provided, which however, may be readily released by pressure of the foot upon the locking attachment.

Various changes may be made without departing from the spirit of the invention as claimed.

What is claimed is:

1. The combination with a transmission gear actuating pedal, of a plate detachably secured to the foot plate of the pedal, a foot plate hinged to said detachably connected plate, an arm projecting laterally from the upper end of said hinged plate, and a rigidly fixed rack bar with which said laterally projecting arm is adapted to engage when the pedal is depressed.

2. The combination with a transmission gear control pedal, of a foot plate hinged to the upper end of said pedal, a spring for normally holding said hinged plate in a predetermined position, an arm projecting laterally from the upper end of said hinged plate, and a rack bar with which said laterally projecting arm is adapted to engage when the pedal is depressed.

3. An attachment for the transmission gear actuating pedal of a motor vehicle comprising a curved plate adapted to be detachably applied to the upper end of the pedal, a plate hinged to said curved plate, a spring associated with the hinge between the plates for retaining the foot plate in a predetermined position, an arm projecting laterally from the upper portion of the foot plate, and a rack bar with which said arm is adapted to engage when the pedal to which the foot plate is applied is depressed.

In testimony whereof I have signed my name to this specification.

JAMES W. ROGERS.